United States Patent
Gupta et al.

(10) Patent No.: US 12,034,613 B2
(45) Date of Patent: Jul. 9, 2024

(54) SMART TICKET ROUTING TO DETERMINED SUPPORT TEAM

(71) Applicant: CERNER INNOVATION, INC., Kansas City, KS (US)

(72) Inventors: Shishir Gupta, Bangalore (IN); Guru Shankar, Bangalore (IN); Pramod Kumar Deshpande, Bangalore (IN)

(73) Assignee: CERNER INNOVATION, INC., Kansas City, MO (US)

( * ) Notice: Subject to any disclaimer, the term of this patent is extended or adjusted under 35 U.S.C. 154(b) by 0 days.

(21) Appl. No.: 17/178,578

(22) Filed: Feb. 18, 2021

(65) Prior Publication Data
US 2022/0263731 A1    Aug. 18, 2022

(51) Int. Cl.
| | | |
|---|---|---|
| *H04L 41/5074* | (2022.01) | |
| *G06F 40/205* | (2020.01) | |
| *G06F 40/289* | (2020.01) | |
| *G06F 40/30* | (2020.01) | |
| *H04L 41/5061* | (2022.01) | |

(52) U.S. Cl.
CPC ........ *H04L 41/5074* (2013.01); *G06F 40/205* (2020.01); *G06F 40/289* (2020.01); *G06F 40/30* (2020.01); *H04L 41/5064* (2013.01)

(58) Field of Classification Search
CPC ............. H04L 41/5064; H04L 41/5074; G06F 40/205; G06F 40/289; G06F 40/30
USPC ......................................................... 709/223
See application file for complete search history.

(56) References Cited

U.S. PATENT DOCUMENTS

| | | | | |
|---|---|---|---|---|
| 9,037,537 | B2* | 5/2015 | DeRoller | G06F 16/93 |
| | | | | 707/608 |
| 9,763,064 | B2* | 9/2017 | Ruff | H04W 4/14 |
| 10,178,537 | B2* | 1/2019 | Rauner | H04W 4/90 |
| 10,628,250 | B2* | 4/2020 | Chafle | G06F 11/079 |
| 10,769,522 | B2* | 9/2020 | Bhatt | G06N 3/0445 |
| 10,831,999 | B2* | 11/2020 | Mandal | G06F 40/295 |
| 10,936,968 | B2* | 3/2021 | Elliott, Jr. | H04L 47/2441 |
| 10,955,520 | B2* | 3/2021 | Chua | G06K 7/1413 |
| 11,042,581 | B2* | 6/2021 | Jan | G06F 16/355 |
| 11,182,177 | B2* | 11/2021 | Hamze | G06F 8/10 |
| 2002/0007453 | A1* | 1/2002 | Nemovicher | H04L 63/0823 |
| | | | | 713/155 |
| 2006/0111967 | A1* | 5/2006 | Forbes | G06Q 30/0267 |
| | | | | 705/14.26 |
| 2014/0336795 | A1* | 11/2014 | Asenjo | G05B 19/4083 |
| | | | | 700/86 |
| 2015/0287318 | A1* | 10/2015 | Nair | G06Q 10/10 |
| | | | | 340/5.6 |

(Continued)

Primary Examiner — David P Zarka
(74) Attorney, Agent, or Firm — Invoke

(57) ABSTRACT

Technologies are provided for automatically routing service requests (e.g., trouble tickets). More particularly, embodiments of the present invention provide a real-time routing system that helps reduce the wait time on the assignment of client logged support requests. To do so, a batch job may run regularly (e.g., every 5 minutes) to identify newly logged tickets by querying a ticket database corresponding to a ticket system. The smart routing systems utilizes an iterative process to identify the most appropriate associate on the most appropriate support team for assigning the ticket. Once the appropriate associate has been identified, the client as well as the associate may be notified regarding the ticket assignment.

21 Claims, 8 Drawing Sheets

(56) References Cited

U.S. PATENT DOCUMENTS

| | | | |
|---|---|---|---|
| 2016/0110723 A1* | 4/2016 | Shimpi | G06Q 30/016 705/304 |
| 2017/0068963 A1* | 3/2017 | Saxena | G06Q 10/063112 |
| 2017/0126485 A1* | 5/2017 | Brew | H04L 67/16 |
| 2017/0212756 A1* | 7/2017 | Ryali | G06F 8/60 |
| 2018/0012232 A1* | 1/2018 | Sehrawat | H04L 51/02 |
| 2018/0025361 A1* | 1/2018 | Ferrarons Llagostera | G06F 16/24578 705/304 |
| 2018/0211260 A1* | 7/2018 | Zhang | G06Q 30/016 |
| 2018/0218015 A1* | 8/2018 | Haddock | G06F 16/36 |
| 2018/0268059 A1* | 9/2018 | Lipsky | G06F 16/951 |
| 2018/0322412 A1* | 11/2018 | Elliott, Jr. | G06N 20/00 |
| 2019/0347599 A1* | 11/2019 | Fry | G06N 20/00 |
| 2019/0370710 A1* | 12/2019 | Macandog | G07C 9/25 |
| 2020/0258013 A1* | 8/2020 | Monnett | G06Q 10/06 |
| 2021/0004706 A1* | 1/2021 | Riddle | G06Q 10/10 |
| 2021/0014136 A1* | 1/2021 | Rath | G06Q 30/016 |
| 2021/0105362 A1* | 4/2021 | Lahav | G06Q 10/06 |
| 2021/0224124 A1* | 7/2021 | Barsalou | G06F 9/485 |
| 2021/0224306 A1* | 7/2021 | Choudhary | G06N 5/04 |
| 2021/0349753 A1* | 11/2021 | Ou | G06F 9/4856 |

* cited by examiner

SMART TICKET ROUTING TO DETERMINED SUPPORT TEAM

BACKGROUND

Support services teams supporting large organizations typically receive hundreds of thousands of service requests annually. Conventionally, if a support request (e.g., a trouble ticket) cannot be resolved by tier 1 support personnel, it is escalated to tier 2 expert personnel or tier 3 engineering support personnel. Support requests may arrive from many geographical regions. For example, support request may originate from Middle East clients. Based on the organizational structure, when the support requests are created by Middle East clients, the support requests may be initially routed to a tier 1 support team in a different geographic region. For example, the tier 1 support requests may initially be assigned to a tier 1 support team in the United States.

However, based on differences in time zones between the originating client and the initially assigned support team, an initial delay may result before the support request is even acknowledged for the first time. As a result, the support request may sit in the queue until the US tier 1 support team arrives for the day. Moreover, because the support ticket refers to a Middle East client, there may be an organizational policy that a geographically close support team (e.g., a Middle East support team) handles the service request. Thus, even when the US tier 1 support team arrives and acknowledges the service request for the first time, it may be required, as part of the organizational policy, to simply route the service request back to the Middle East support team Consequently, an additional delay in rendering support services to clients is the result. As can be appreciated, similar scenarios occur frequently as global corporations often have clients spread throughout many geographic regions and different time zones, while support personnel may be in specific areas or have specific specialties that require specialized routing. Because conventional systems do not initially and automatically account for these circumstances, delays are inevitable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to automatically routing service requests (e.g., trouble tickets). More particularly, embodiments of the present invention provide a real-time routing system that helps reduce the wait time on the assignment of client logged support requests. To do so, a batch job may run regularly (e.g., every 5 minutes) to identify newly logged tickets by querying a ticket database corresponding to a ticket system. The smart routing systems utilizes an iterative process to identify the most appropriate associate on the most appropriate support team for assigning the ticket.

In embodiments, the smart routing system may identify which geographical locations are able or eligible to handle a particular ticket from a client contract standpoint. The smart routing system may also identify which associates have the required knowledge to work on the particular ticket. Other considerations such as which associates are available at the time of routing or which associate has the lowest queue size. Once the appropriate associate has been identified, the client as well as the associate may be notified regarding the ticket assignment. The notification may indicate the ticket has been automatically routed by the smart routing system. The smart routing system may additionally prevent the assignee from reassigning the ticket. Finally, the ticket system may be updated to reflect smart routing has been utilized for the particular ticket.

BRIEF DESCRIPTION OF THE DRAWINGS

The present invention is described in detail below with reference to the attached drawing figures, wherein.

DETAILED DESCRIPTION

Figure 1:
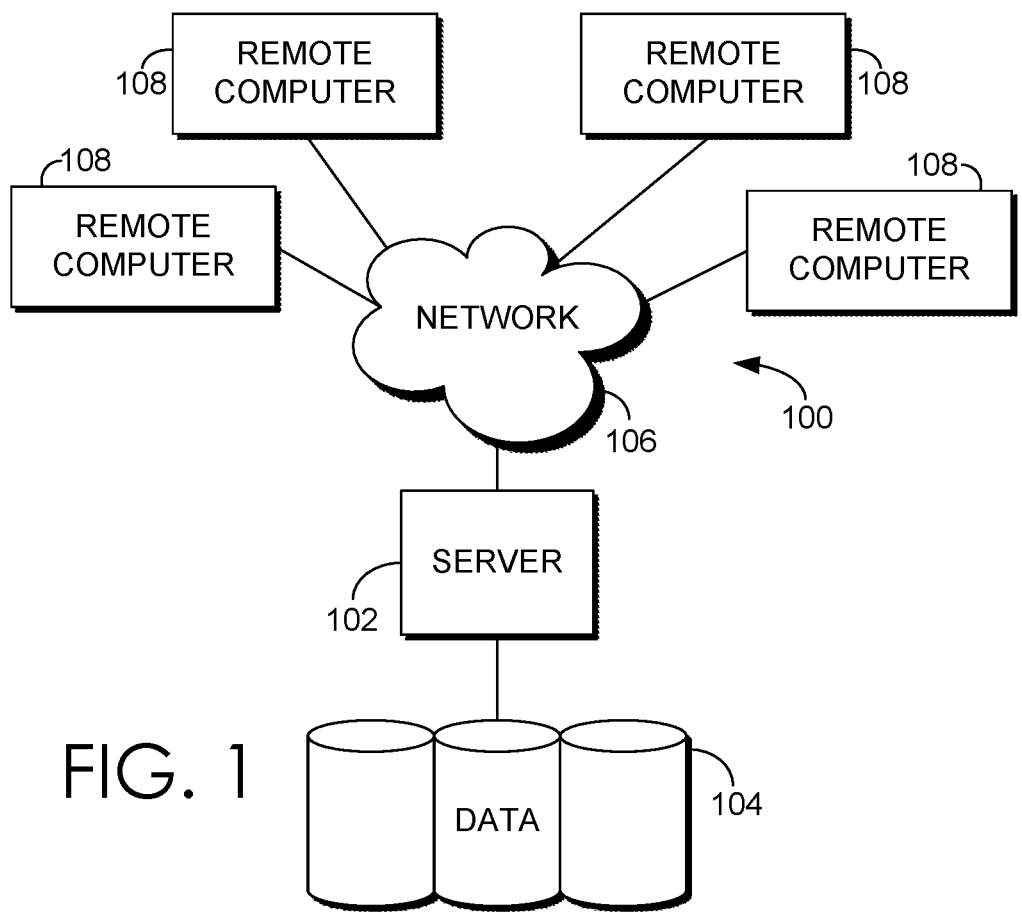
FIG. 1 is a block diagram of an exemplary computing environment suitable for use in implementing the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

As noted in the Background, because of differences in time zones between an originating client and an initially assigned support team conventional service request systems (e.g., support systems) often experience delays before support requests are even acknowledged for the first time. As a result, a support request may sit in a queue until the appropriate support team arrives for the day. Moreover, organizational policies may require a specific support team (e.g., a geographically close support team) handle the service request. Thus, even when a support team that has been initially routed the ticket arrives for the day and acknowledges the service request for the first time, it may be required, as part of the organizational policy, to simply route the service request to a different support team.

The end result is additional and unnecessary delays in rendering support services to clients. As can be appreciated, similar scenarios occur frequently as global corporations often have clients spread throughout many geographic regions and different time zones, while support personnel may be in specific areas or have specific specialties that require specialized routing. Because conventional systems do not initially and automatically account for these circumstances, delays are inevitable.

Embodiments of the present invention relate to automatically routing service requests. More particularly, embodiments of the present invention provide a real-time routing system that helps reduce the wait time on the assignment of client logged support requests. To do so, a batch job may run regularly (e.g., every 5 minutes) to identify newly logged tickets by querying a ticket database corresponding to a ticket system. The smart routing systems utilizes an iterative process to identify the most appropriate associate on the most appropriate support team for assigning the ticket.

In embodiments, the smart routing system may identify which geographical locations are able or eligible to handle a particular ticket from a client contractual standpoint. The smart routing system may also identify which associates have the required knowledge to work on the particular ticket. Other considerations such as which associates are available at the time of routing or which associate has the lowest queue size. Once the appropriate associate has been identified, the client as well as the associate may be notified regarding the ticket assignment. The notification may indicate the ticket has been automatically routed by the smart routing system. The smart routing system may additionally prevent the assignee from reassigning the ticket. Finally, the ticket system may be updated to reflect smart routing has been utilized for the particular ticket.

In some embodiments, the ticket summary or description may searched for specified keywords. For example, a list of keywords may be supplied by a particular support team. The keywords may also be directed to specific terms such as scheduling, reporting, person management, registration team, or anything specific to a particular locale). If a keyword is not found, the ticket might be routed to the United States support team or a primary support hub. If the keyword is found, the smart routing system routes the tickets to an associate of the appropriate team.

Smart routing can also route tickets to other support teams if the initially selected support team does not currently have capacity (e.g., a small support team may only have limited availability). The smart routing system also has the ability to identify if a ticket is a certain severity (e.g., critical or high). Accordingly, the smart routing system can exclude those tickets from being automatically routed.

In embodiments, the smart routing system leverage machine learning to automatically predict the nature of the tickets. For example, a classification algorithm (e.g., a support vector machine) may classify tickets as change tickets or incident tickets. In some embodiments, keyword logic may be leveraged to search for knowledge base articles comprising keywords identified in a particular ticket. If the smart routing system finds a knowledge base article relevant to the particular ticket, a link to the knowledge base article can be automatically shared in the working log of that ticket. The smart routing system may be periodically fed differential data for teaching the classification algorithm.

If the ticket is predicted to be a change ticket, the earlier support layers may be bypassed and the ticket may be directly routed to the change team. The smart routing system may also utilize other filters (e.g., solution alignment, queue size, etc.) to identify the most eligible support associate. For example, if the current queue size for an associate is below the queue cap, the smart routing system assigns the ticket to the associate. If not, the smart routing system may assign the ticket to a different associate. Data corresponding to associate queue caps as provided by a particular support team may be fed to the smart routing system.

In embodiments, the smart routing system might utilize knowledge based suggestions are based on keyword logic. For example, every product has knowledge base articles. Based on keywords in the ticket, knowledge base articles are searched. If smart routing finds a knowledge base article relevant to a particular ticket, smart routing shares a link to the working log of that ticket. When an associate receives the ticket, the associate can already have some information corresponding to the ticket other than what has been documented by the client.

In an example, the smart routing system initially identifies tickets in the queue. If the ticket is a pharmacy ticket, originating from a Middle East client, the smart routing system can narrow the destination down to the correct support team. For example, a pharmacy support team in Bangalore may be responsible for pharmacy tickets for Middle East clients. Further, the Bangalore pharmacy team may have five or six associates, so the smart routing system has to determine which of the five or six associates in the Bangalore pharmacy team should receive the ticket. Additionally, or alternatively, the smart routing system may determine the type of ticket. For example, the ticket may be an incident, or a situation where something is not working properly and a client is requesting the issue be fixed. In another example, the ticket may be a configuration ticket, or a situation where the client is asking that something be configured in a certain way (e.g., the client wants a new drop down in a user interface for a new medication).

In embodiments, the smart routing system parses the free flow of the text of the ticket, and natural language processing logic enables the smart routing system to make an accurate prediction of whether the ticket is an incident ticket or change ticket. Thus, of the five or six support associates in the Bangalore pharmacy support team, the ticket can be routed to the associates that handle the predicted type of ticket. In contrast, conventional systems typically route all tickets to an incident team that has twenty four hours to determine whether the ticket should be routed to a configuration (or change) team. The smart routing system enables the ticket to bypass the incident team and go straight to the configuration team, saving valuable time and labor.

Referring back to the Bangalore pharmacy support team, the smart routing system might identify that some associates are not on shift or are on vacation. For example, vacation or shift information may be fed into the smart routing system. Those associates may be avoided to prevent delays. Of the available associates, the smart routing system may identify which associate has the lowest queue size and selects that person as the ticket recipient. Overall, the smart routing system process reduces delays in the ticket routing and resolution process from potentially twenty four hours or more to a matter of minutes.

Accordingly, in one aspect, an embodiment of the present invention is directed to a method. The method includes receiving one or more tickets in a queue. The method also comprises automatically parsing free flow text of a ticket of the one or more tickets in the queue. The method further comprises utilizing natural language processing logic, predicting a ticket type of the ticket. The method also comprises, based on the parsing and the predicting, determining a support team of a group of support teams. The method further comprises routing the ticket to an associate of the support team.

In another aspect of the invention, an embodiment is directed to one or more computer storage media having computer-executable instructions embodied thereon that, when executed by a computer, causes the computer to perform operations. The operations comprises receiving one or more tickets in a queue. The operations also comprise automatically parsing free flow text of a ticket of the one or more tickets in the queue. The operations further comprise utilizing natural language processing logic, predicting a ticket type of the ticket. The operations also comprise, based on the parsing and the predicting, determining a support team of a group of support teams. The operations further comprise routing the ticket to an associate of the support team.

In a further aspect, an embodiment is directed to a system that includes one or more processors and a non-transitory computer storage medium storing computer-useable instructions that, when used by the one or more processors, cause the one or more processors to: receive one or more tickets in a queue; automatically parse free flow text of a ticket of the one or more tickets in the queue; utilizing natural language processing logic, predict a ticket type of the ticket; based on the parsing and the predicting, determine a support team of a group of support teams; and route the ticket to an associate of the support team.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention might be operational with numerous other purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Computer storage media does not include signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, ambulatory settings, medical billing and financial offices, hospital administration settings, home healthcare environments, clinicians' offices, Center for Disease Control, Centers for Medicare & Medicaid Services, World Health Organization, any governing body either foreign or domestic, Health Information Exchange, and any healthcare/government regulatory bodies not otherwise mentioned. The remote computers 108 might also be physically located in nontraditional medical care environments so that the entire healthcare community might be capable of integration on the network. In various embodiments, the remote computers 108 may represent clients or infrastructure of a client (e.g., devices, applications, services, and the like) or the remote computers 108 may represent user devices corresponding to a support team. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
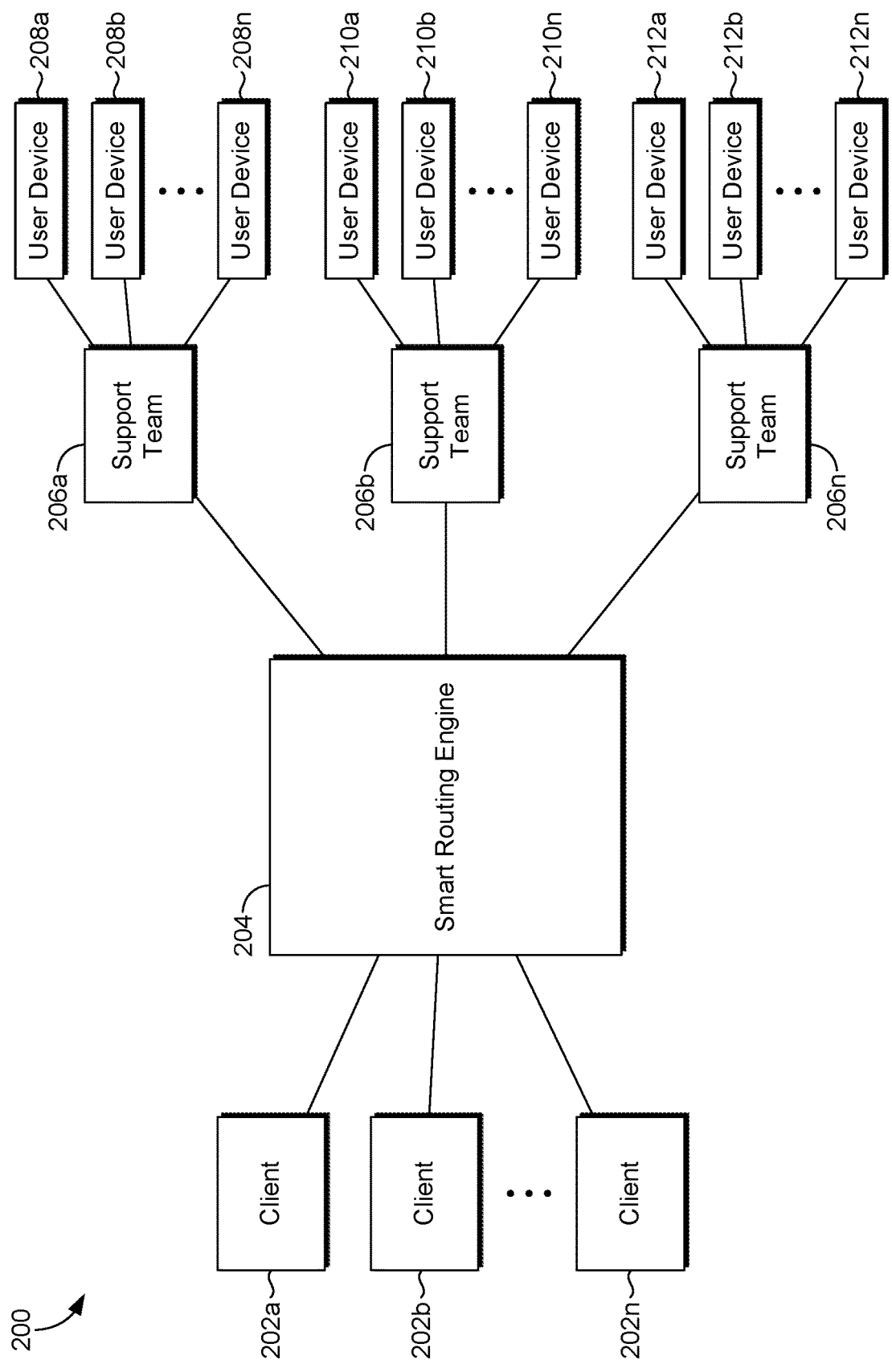
FIG. 2 is a block diagram of an exemplary system for providing smart routing, in accordance with an embodiment of the present disclosure.

Turning now to FIG. 2, a smart routing system 200 is depicted suitable for use in implementing embodiments of the present invention. The smart routing system 200 is merely an example of one suitable computing system environment and is not intended to suggest any limitation as to the scope of use or functionality of embodiments of the present invention. Neither should the smart routing system 200 be interpreted as having any dependency or requirement related to any single module/component or combination of modules/components illustrated therein.

The smart routing system 200 includes clients 202a-202n, smart routing engine 204, support teams 206a-206n, and user devices 208a-208n, 210a-210n, 212a-212n, and may be in communication with one another via a network. The network may include, without limitation, one or more secure local area networks (LANs) or wide area networks (WANs). The network may be a secure network associated with a facility such as a healthcare facility (e.g., 202a, 202b, or 202n). The secure network may require that a user log in and be authenticated in order to send and/or receive information over the network.

The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, smart routing engine 204 might reside on a server, cluster of servers, or a computing device remote from one or more of the remaining components. Although illustrated as separate systems, the functionality provided by each of these components might be provided as a single component/module. The single unit depictions are meant for clarity, not to limit the scope of embodiments in any form.

Components of the smart routing system 200 may include a processing unit, internal system memory, and a suitable system bus for coupling various system components, including one or more data stores for storing information (e.g., files and metadata associated therewith). Components of the smart routing system 200 typically includes, or has access to, a variety of computer-readable media.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Smart routing engine 204 includes or has access to infrastructure that is capable of receiving, for example, information from clients 202a-202n. The information received in association with smart routing engine 204 may comprise service requests. For example, client 202a may submit a service request (e.g., a trouble ticket or ticket) corresponding to an incident, or a situation where something is not working properly within the client infrastructure and a client is requesting the issue be fixed. In another example, the client 202a may submit a service request corresponding to a configuration ticket, or a situation where the client is asking that something within the client infrastructure be configured in a certain way (e.g., they want a new drop down in a user interface for a new medication).

Generally, the smart routing engine 204 is configured to receive one or more tickets that have been submitted to a queue or identify newly logged tickets that have entered the queue. For example, the smart routing engine 204 may execute a batch job that runs regularly (e.g., every 5 minutes) to identify newly logged tickets by querying a ticket database or queue. Once received or identified, the smart routing engine routes the ticket to the appropriate support team 206a-206n.

Support team 206a-206n is generally configured to provide support services and resolution for clients 202a-202n in response to service request received by smart routing engine 204 and routed to the appropriate support team. Support team comprises a number of user devices corresponding to associates of a particular support team. The associates interact with the service requests via the user devices to provide the requested services or resolution on behalf of clients 202*a*-202*n*.

User devices 208*a*-208*n*, 210*a*-210*n*, 212*a*-212*n* may be any type of computing device used within a support services center or as part of a support team process to receive, display, communicate information to another user or system, configure or troubleshoot infrastructure corresponding to clients, or perform services on behalf of clients to address service requests. User device may be capable of communicating via a network with smart routing engine 204, clients 202*a*-202*n*, or the infrastructure of clients 202*a*-202*n*. Such devices may include any type of mobile and portable devices including cellular telephones, personal digital assistants, tablet PCs, smart phones, and the like.

Figure 3:
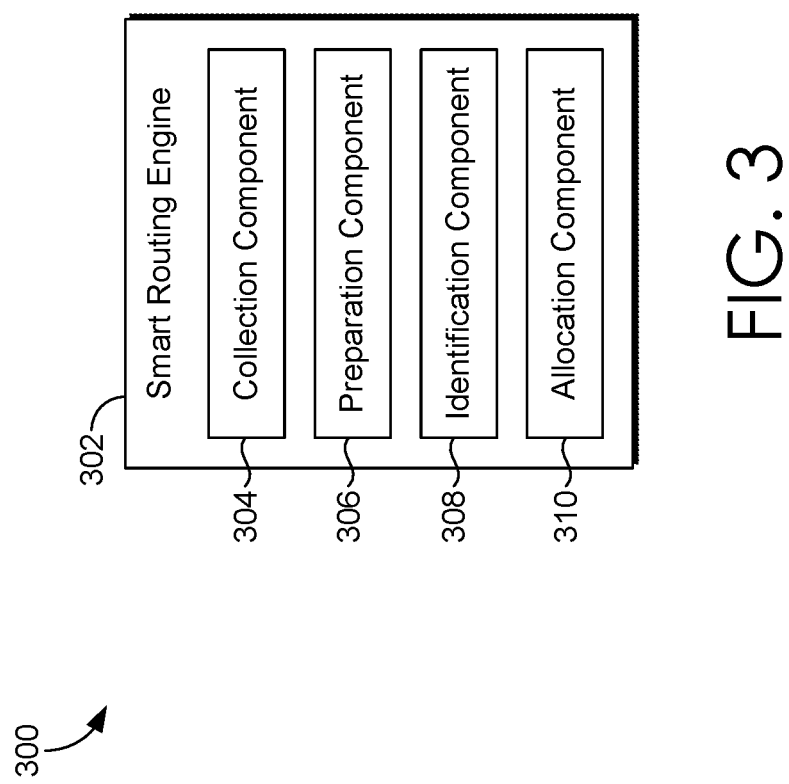
FIG. 3 is a block diagram of an exemplary implementation of a smart routing engine, in accordance with some embodiments of the present disclosure.

Referring now to FIG. 3, the smart routing engine 302 includes several components. For example, the smart routing engine 302 may include collection component 304, preparation component 306, identification component 308, and allocation component 310. Initially, collection component 304 receives service requests from a support system supporting one or more clients. In embodiments, collection component 304 executes a regularly scheduled batch job (e.g., every 5 minutes) to identify all new tickets that have been received in the queue of the support system.

Preparation component 306 generally automatically parses the free flow text of tickets in the queue. For example, a summary or description of the ticket may be searched to identify keywords corresponding to a particular support team of a group of support teams. The keywords may be directed to specific terms including scheduling, reporting, person management, registration team, or a particular locale. The presence of a specific term may help identification component 308 determine which support team is responsible for resolving the ticket.

Preparation component 306 also predicts a ticket type of the ticket. As noted previously, conventional systems typically route all tickets to an incident team that has twenty four hours to determine whether the ticket should be routed to a configuration (or change) team. Preparation component 306 predicts whether the ticket is likely to be converted to a change ticket utilizing a classification algorithm. For example, preparation component 306 may utilize a support vector machine algorithm on the free flow text summary of the ticket. As described below, the support vector machine may be periodically fed differential data for teaching the machine learning algorithm to distinguish between ticket types. If the ticket is predicted to be a change ticket, the earlier support layers may be bypassed and the ticket may be directly routed to the change team, saving valuable time and manpower.

In embodiments, the support vector machine initially receives the free flow text of the ticket and removes common words (e.g., a, the). The support vector machine then looks at stem words and converts the stem words into a vector equivalent. To train the support vector machine, a library of labeled data may be leveraged and fed into the algorithm. The support vector machine may find patterns in key words and typical descriptions that are indicative of change tickets. For example, the support vector machine may be trained with fifty thousand change tickets and fifty thousand incident tickets. Change tickets may have words such as request, add, modify, remove, or edit while incident tickets may have words such as error. The support vector machine is trained using the labeled data to learn these patterns.

Utilizing test data, the support vector machine may output a probability between 0 and 1. For example, if the output is closer to 1, then the ticket may have a high probability of being a change ticket. If the output is closer to 0, then the ticket may have a high probability of being an incident ticket. In some cases, if the probability is not determinate (e.g., 0.56), the preparation component 306 may determine exclude that ticket from being automatically routed by smart routing system. In practice, only forty to fifty percent of tickets might actually be automatically routed; however, those that are automatically routed have a high probability of being correct so accuracy is not compromised.

Additionally, preparation component 306 may identify knowledge based articles relevant to the ticket. Once identified, preparation component 306 attach a link to the identified knowledge base articles to the ticket so once an associate is routed the ticket, the associate already has a resource that can be leveraged to resolve the ticket.

Identification component 308 is generally configured to determine the most appropriate associate of the most appropriate support team to route the ticket. For example, identification component 308 may associate the originating client of the ticket with a particular support team of the group of support teams. In other words, a particular support team may be responsible for resolving tickets that originate with a specific client. If the specific client is identified, it may help identification component 308 determine which support team should be routed the ticket. Similarly, identification component 308 may associate a region corresponding to the client that originated the ticket with a particular support team of the group of support teams. A particular region may be responsible for tickets originating from that client or may be better situated to resolve the ticket (e.g., based on time zone, lack of language barriers, or other factors).

Identification component 308 may also identify restrictions corresponding to an originating client of the ticket. For example, contractual or other restrictions may necessitate that a particular support team is routed a ticket originating with a particular client. Additionally or alternatively, identification component 308 may associate a severity of the ticket or how long a ticket has been pending with a particular support team, or prevents the ticket from being automatically routed altogether by the smart routing system.

In embodiments, the identification component 308 identifies associates that are not on shift or are on vacation and excludes those associates from the routing. Moreover, if a particular support team is already at capacity or otherwise unable to be routed additional tickets, the identification component 308 may identify an alternative support team or prevent the smart routing system from routing tickets to that support team until capacity exists.

In embodiments, identification component 308 utilizes filters to identify an associate of the appropriate support team. For example, the identification component 308 may utilize a queue size filter to identify the associate of the appropriate support team that has the lowest queue size and selects that associate as the routing destination for the ticket. The identification component 308 may additionally receive data corresponding to a queue cap for associates of the appropriate support team and route the ticket to the associate based on the queue size being below the queue cap.

In another example, the identification component 308 may utilize a solution alignment filter to identify the associate of the appropriate support team that is qualified to resolve a particular ticket corresponding to a particular solution category. To do so, information corresponding to skills or qualifications of each associate may be available to the allocation component 310 so the identification component 308 may align the required skills or qualifications required to resolve the ticket with the skills or qualifications of the associates. Additionally or alternatively, identification component 308 identifies a solution category of the ticket based on a selection made by the creator of the ticket. In embodiments, the solution category may be automatically identified by identification component 308 using keyword searching or classification algorithms. In embodiments, a particular support team may be responsible for resolving tickets corresponding to a particular solution category. Accordingly, if a solution category is identified by identification component 308, it may help determine which support team should be routed the ticket.

Allocation component 310 generally assigns the ticket to the appropriate associate of the appropriate support team based on execution of the preparation component 306 and the identification component 308. In some embodiments, the allocation component 310 provides an email notification to the associated indicating the ticket is a smart routing ticket. The allocation component 310 may also prevent a ticket that has been routed by the smart routing system from being reassigned by the associate to another associate. The support system may also be updated to reflect that smart routing has been utilized to route the ticket. An originating client of the ticket may also be notified that the ticket has been routed to the associate.

Figure 4:
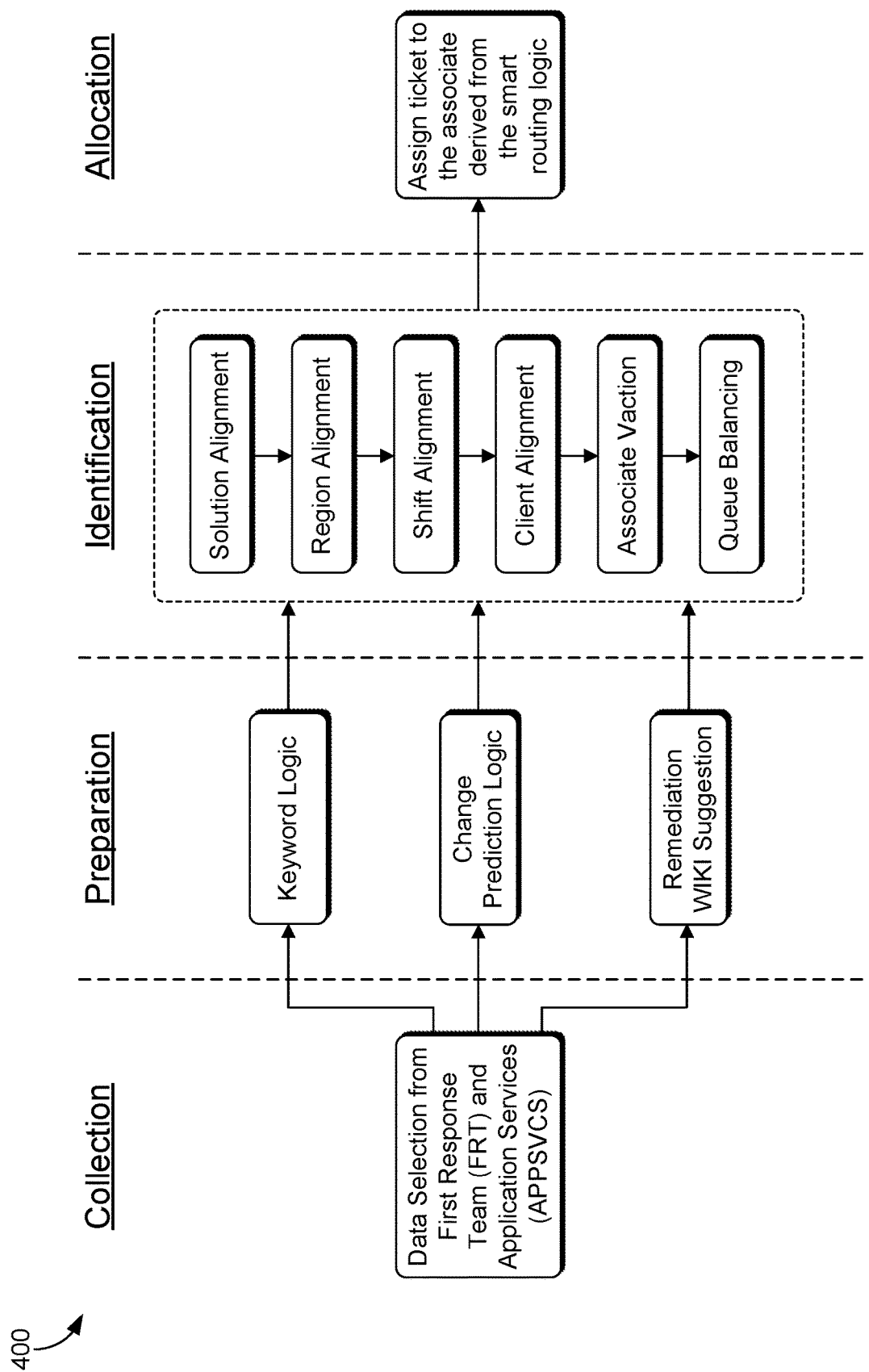
FIG. 4 depicts a flow diagram showing an exemplary method for providing smart routing, in accordance with various embodiments of the present disclosure.

As shown in FIG. 4, a flow diagram is provided illustrating a method 400 for providing smart routing, in accordance with various embodiments of the present disclosure, in accordance with various embodiments of the present disclosure. Method 400 may be performed by any computing device (such as computing device described with respect to FIG. 1) with access to an smart routing system (such as the one described with respect to FIG. 2) or by one or more components of the smart routing system (such as the smart routing engine described with respect to FIGS. 2 and 3).

Initially, as shown at step 410, a ticket is created during the collection phase in the support database. At step 420, in the preparation phase, keyword logic and change prediction logic are utilized to identify the presence of a specific term in the ticket and predict the ticket type, respectively. Additionally, knowledge based articles relevant to the ticket are identified and linked to working log of the ticket. At step 430, in the identification phase, the ticket is aligned to a particular associate on a particular support team based on solution category, region or client originating the ticket, shift availability, vacation information, and queue balancing. Finally, at step 440, in the allocation phase, the ticket is assigned to the appropriate associate based on all the information derived in the previous phases.

Figure 5:
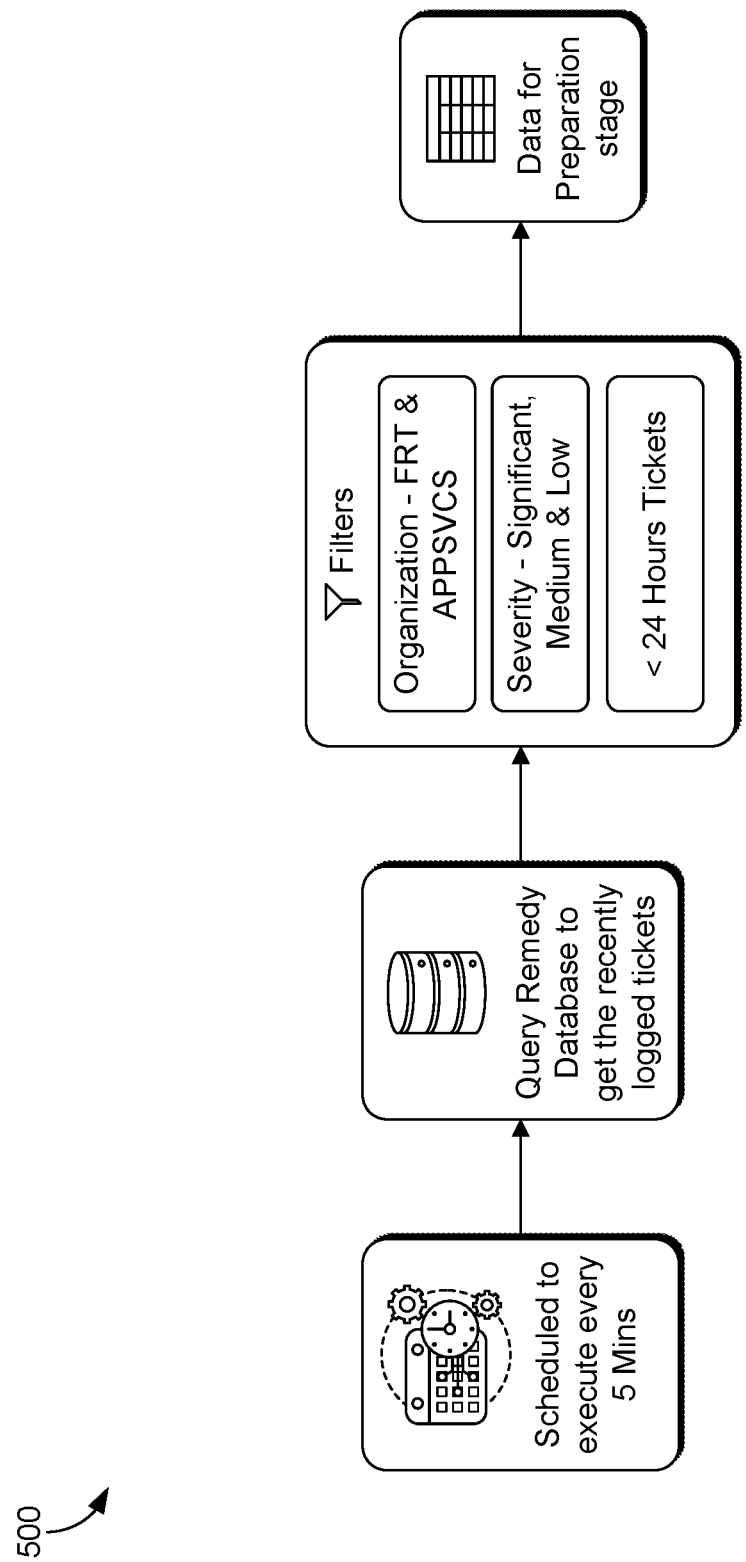
FIG. 5 depicts a flow diagram showing an exemplary method corresponding to the collection phase of the smart routing system, in accordance with various embodiments of the present disclosure.

Referring to FIG. 5, a flow diagram is provided illustrating a method 500 corresponding to the collection phase of the smart routing system, in accordance with various embodiments of the present disclosure, in accordance with various embodiments of the present disclosure. Method 500 may be performed by any computing device (such as computing device described with respect to FIG. 1) with access to an smart routing system (such as the one described with respect to FIG. 2) or by one or more components of the smart routing system (such as the collection component described with respect to FIG. 3).

Initially, as shown at step 510, a batch job may be scheduled to execute every five minutes to identify recently logged tickets. At step 520, the batch job executes and the ticket database is queried for the recently logged tickets. Various filters are applied, at step 530, to determine whether the ticket should be routed through the smart routing system.

For example, based on the client that created the ticket, contractual or other reasons may necessitate that the ticket be excluded from the smart routing system. Similarly, the severity of the ticket (e.g., significant or high) may necessitate that the ticket be excluded from being routed by the smart routing system. Additionally, the pending time of the ticket may prevent the ticket from being routed by the smart routing system. If the ticket is not excluded by any of the filters, it is ready to proceed to the preparation phase, as shown at step 540.

Figure 6:
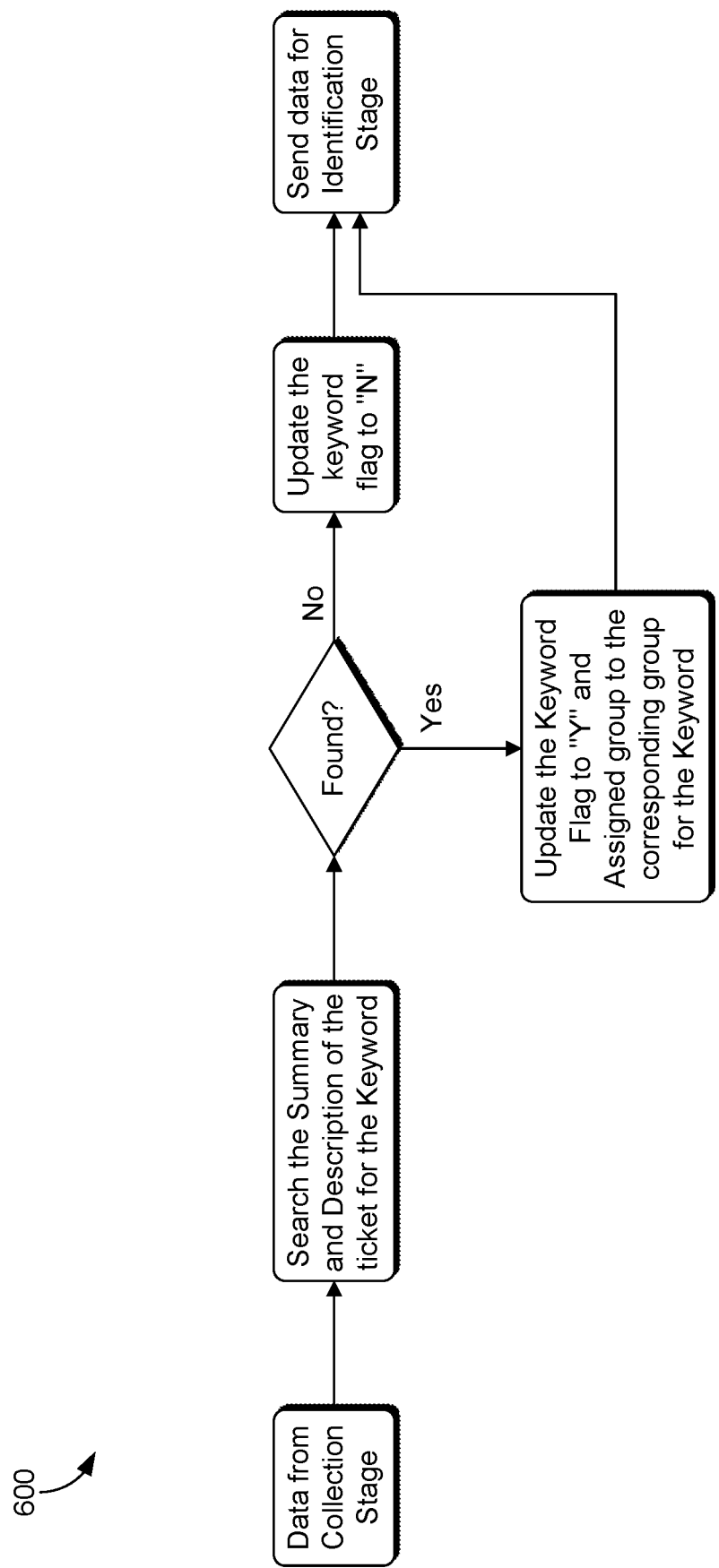
FIG. 6 depicts a flow diagram showing an exemplary method corresponding to the preparation phase of the smart routing system, in accordance with various embodiments of the present disclosure.

In FIG. 6, a flow diagram is provided illustrating a method 600 corresponding to the preparation phase of the smart routing system, in accordance with various embodiments of the present disclosure, in accordance with various embodiments of the present disclosure. Method 600 may be performed by any computing device (such as computing device described with respect to FIG. 1) with access to an smart routing system (such as the one described with respect to FIG. 2) or by one or more components of the smart routing system (such as the preparation component described with respect to FIG. 3).

Initially, as shown at step 610, data corresponding to the ticket is received from the collection phase. The summary and description of the ticket is searched, at step 620, for keywords relevant to a particular support group of the support groups. At step 630, it is determined whether a keyword was found. If a keyword was not found, as shown at step 640, the keyword flag is updated to "N" and the data corresponding to the ticket is sent to the identification phase, at step 650 for further consideration. If a keyword was found, as shown at step 642, the keyword flag is updated to "Y" and the ticket is assigned to the particular support group. The assigned ticket is sent to the identification phase, at step 650, for further consideration and identification of a particular associate of the particular support group.

Figure 7:
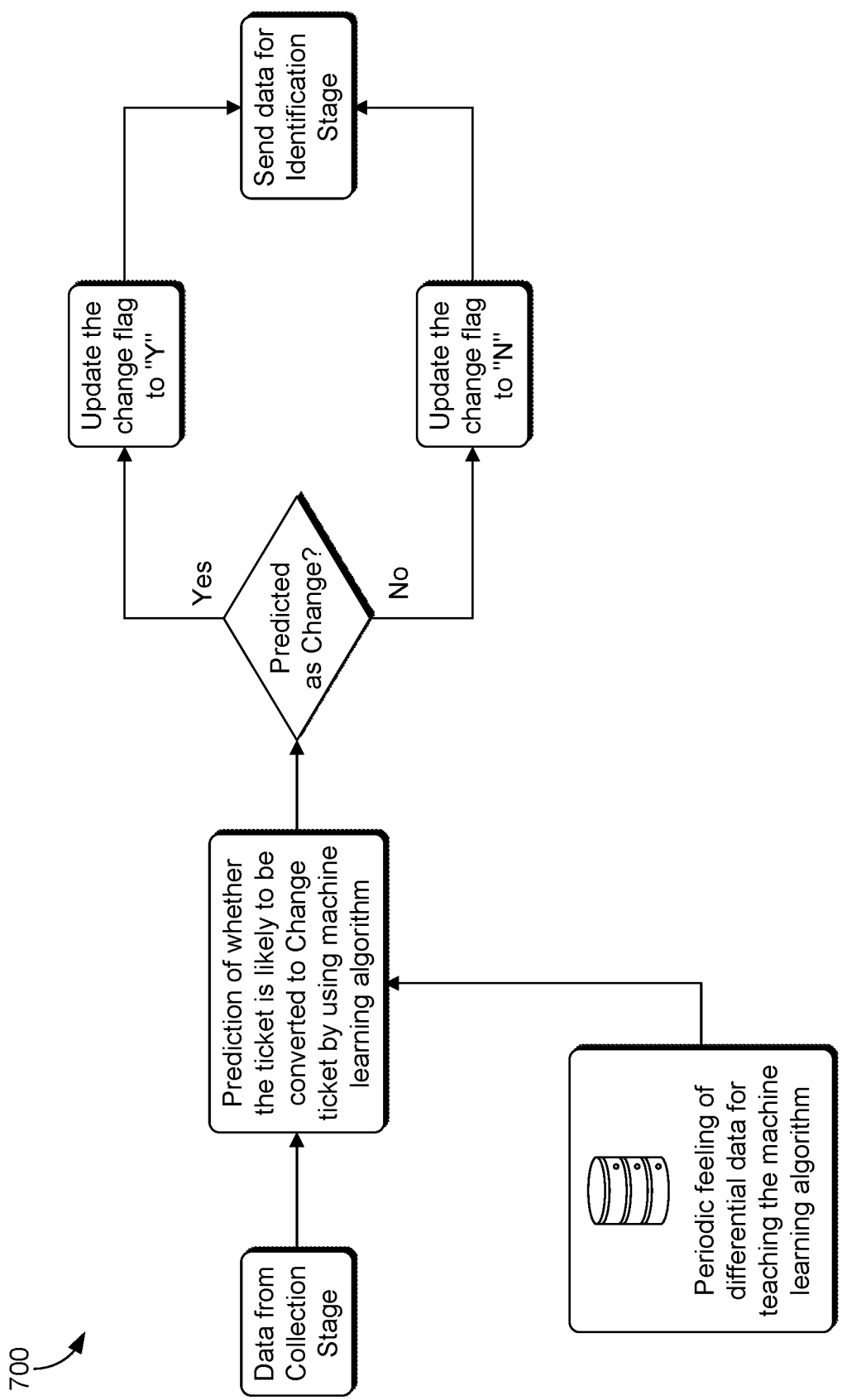
FIG. 7 depicts a flow diagram showing an exemplary method corresponding to the preparation phase of the smart routing system, in accordance with various embodiments of the present disclosure.

Turning now to FIG. 7, a flow diagram is provided illustrating a method 700 corresponding to the preparation phase of the smart routing system, in accordance with various embodiments of the present disclosure. Method 700 may be performed by any computing device (such as computing device described with respect to FIG. 1) with access to an smart routing system (such as the one described with respect to FIG. 2) or by one or more components of the smart routing system (such as the preparation component described with respect to FIG. 3).

Initially, as shown at step 710, data corresponding to the ticket is received from the collection phase. A prediction of whether the ticket is likely to be converted to a change ticket is made, at step 720, by a classification algorithm. As described herein, the classification algorithm is periodically fed, as shown at step 722, differential data for teaching the classification algorithm to distinguish between change tickets and incident tickets. At step 730, it is determined whether the ticket is predicted as a change ticket. If the ticket is predicted as a change ticket, as shown at step 740, the change flag is updated to "Y" and data corresponding to the ticket is sent to the identification phase, at step 750. If the ticket is not predicted as a change ticket, as shown at step 742, the change flag is updated to "N" and data corresponding to the ticket is sent to the identification phase, at step 750.

Figure 8:
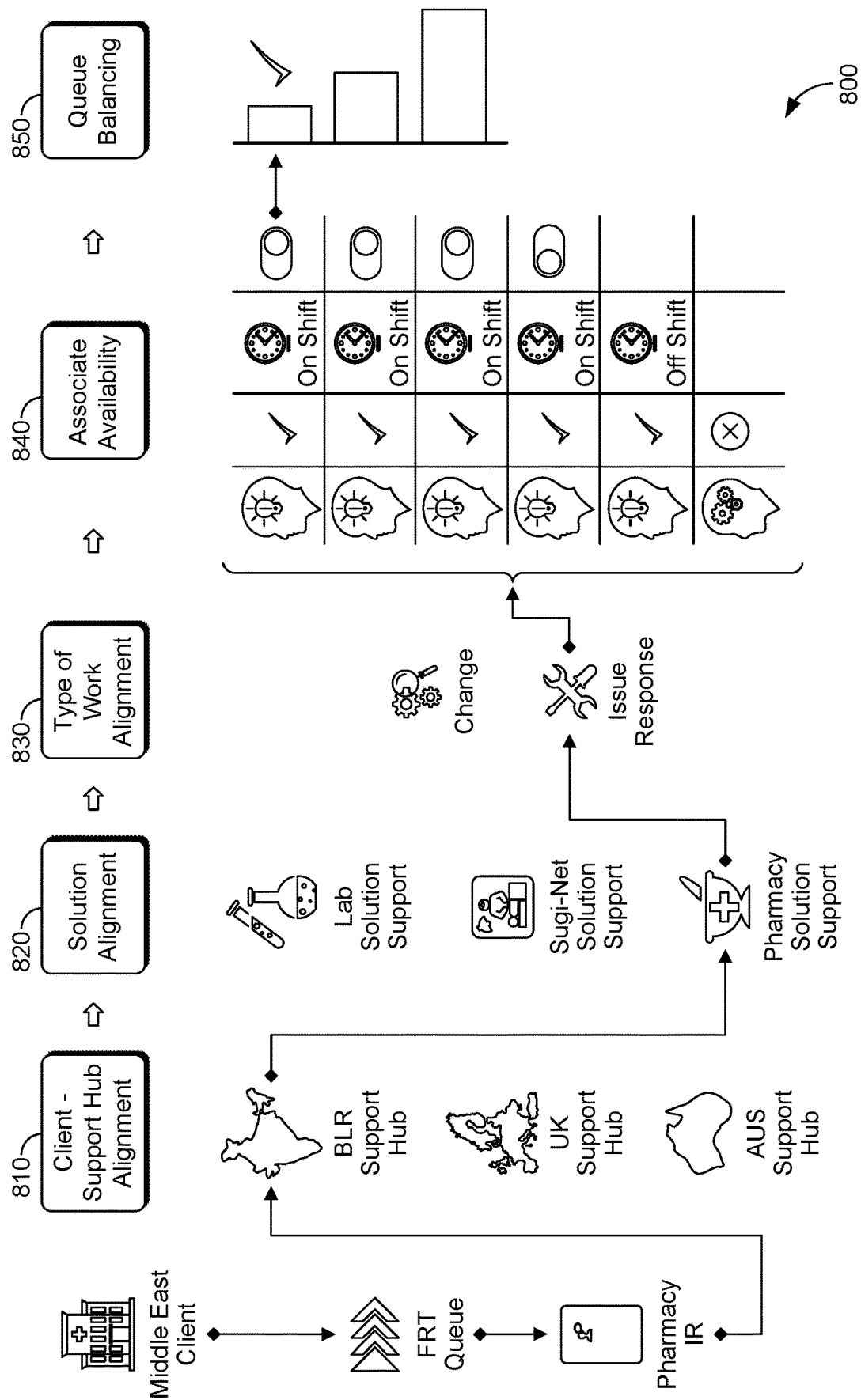
FIG. 8 depicts a flow diagram showing an exemplary method corresponding to the identification phase of the smart routing system, in accordance with various embodiments of the present disclosure.

Turning now to FIG. 8, a flow diagram is provided illustrating a method 800 corresponding to the identification phase of the smart routing system, in accordance with various embodiments of the present disclosure, in accordance with various embodiments of the present disclosure. Method 800 may be performed by any computing device (such as computing device described with respect to FIG. 1) with access to an smart routing system (such as the one described with respect to FIG. 2) or by one or more components of the smart routing system (such as the identification component described with respect to FIG. 3).

Initially, as shown at step 810, an alignment between the client and the appropriate support hub or team is identified. As illustrated, the ticket has originated from a Middle East client and is a pharmacy related ticket. Accordingly, the client-support hub alignment may identify the ticket should be routed to the Bangalore support hub. Next, as shown at step 820, a solution alignment is identified. In this example, a keyword in the ticket or a selection made by the creator of the ticket may indicate the ticket is a pharmacy ticket. Accordingly, the solution alignment identifies the ticket is a pharmacy solution support category. At step 830, a type of work alignment is identified. In this example, the ticket is predicted to be an incident ticket. Based on these identifications, associate availability is identified for the Bangalore support hub. For example, some associates may be on shift and some may be off shift. Some associates may not be qualified or experience to resolve a pharmacy solution support category ticket or an incident type ticket. Moreover, some associates may be on vacation. Accordingly, as shown at step 840, the associate availability indicates that of the six associates in the Bangalore support hub, three are available to resolve the ticket. Finally, at step 850 queue balancing indicates that one associate has a smaller queue, which may be determined by a simple count of tickets in each associate's queue, or may be determined by a more complex analysis of the type, number, and complexity of tickets in each associate's queue. Once the associate with the smallest queue is identified, the ticket can be routed to that associate.

As can be understood, the present invention provides systems, methods, and user interfaces for providing regulatory document analysis with natural language processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

We claim:

1. A method comprising:
   receiving one or more tickets in a queue, each of the one or more tickets being a request to configure or troubleshoot infrastructure or perform services to address an information technology service request made by an originating client of a plurality of clients;
   determining an originating client of a ticket of the one or more tickets in the queue;
   determining a region corresponding to the originating client;
   determining that a particular support team, of a group of support teams, is associated with the region of the originating client;
   automatically parsing text of the ticket to generate parsed text and identify keywords;
   determining that the keywords correspond to the particular support team;
   utilizing natural language processing logic, predicting a ticket type of the ticket from the parsed text;
   determining that the ticket type corresponds to the particular support team;
   based on the keywords and the ticket type both corresponding to the particular support team, and on the association of the particular support team with the region of the originating client, selecting the particular support team of the group of support teams; and
   routing the ticket to an associate of the particular support team.

2. The method of claim 1, further comprising identifying newly logged tickets in the queue.

3. The method of claim 1, further comprising determining an originating client of the ticket, wherein the support team of the group of support teams is further based on the originating client.

4. The method of claim 1, further comprising:
   identifying that at least a portion of associates on the support team are not on shift or are on vacation; and
   excluding the at least a portion of associates from the routing.

5. The method of claim 1, further comprising:
   identifying the associate of the support team that has the lowest queue size; and
   selecting the associate of the support team that has the lowest queue size as a routing destination for the ticket.

6. The method of claim 1, further comprising identifying a solution category of the ticket, the solution category selected by a creator of the ticket, wherein the support team of the group of support teams is further based on the solution category of the ticket.

7. The method of claim 1, wherein the parsing comprises searching a summary or description of the ticket to identify the keywords corresponding to a particular support team of the group of support teams.

8. The method of claim 7, wherein the keywords are directed to specific terms including scheduling, reporting, person management, registration team, or a particular locale.

9. The method of claim 1, further comprising utilizing filters to identify the associate of the support team, the filters comprising solution alignment or queue size.

10. The method of claim 9, wherein routing the ticket to the associate is further based on the queue size for the associate being below a queue cap.

11. The method of claim 1, further comprising receiving data corresponding to a queue cap for associates of a particular support team of the group of support teams.

12. The method of claim 1, further comprising, based on the routing, providing an email notification to the associate indicating the ticket is a smart routing ticket.

13. The method of claim 1, further comprising preventing the associate from reassigning the ticket to another associate.

14. The method of claim 1, further comprising updating a ticket system to reflect smart routing has been utilized for the ticket.

15. The method of claim 1, further comprising notifying an originating client of the ticket that the ticket has been routed to the associate.

16. The method of claim 1, further comprising utilizing a trained support vector machine algorithm on the text of the ticket, predicting the ticket type is an incident ticket type or a change ticket type.

17. The method of claim 1, further comprising:
based on the text of the ticket, identifying knowledge base articles relevant to the ticket; and
attaching a link to the identified knowledge base articles to the ticket.

18. The method of claim 1, further comprising:
based on the keywords and the ticket type, selecting a particular associate in the particular support team of the group of support teams; and
routing the ticket to the particular associate.

19. The method of claim 1, wherein the ticket type is an incident ticket type or a change ticket type.

20. One or more computer storage media having computer-executable instructions embodied thereon that, when executed by a computer, causes the computer to perform operations comprising:
receiving one or more tickets in a queue, each of the one or more tickets being a request to configure or troubleshoot infrastructure or perform services to address an information technology service request made by an originating client of a plurality of clients;
determining an originating client of a ticket of the one or more tickets in the queue;
determining a region corresponding to the originating client;
determining that a particular support team, of a group of support teams, is associated with the region of the originating client;
automatically parsing text of the ticket to generate parsed text and identify keywords;
determining that the keywords correspond to the particular support team;
utilizing natural language processing logic, predicting a ticket type of the ticket from the parsed text;
determining that the ticket type corresponds to the particular support team;
based on the keywords and the ticket type both corresponding to the particular support team, and on the association of the particular support team with the region of the originating client, selecting the particular support team of the group of support teams; and
routing the ticket to an associate of the particular support team.

21. A system comprising:
one or more processors; and
a non-transitory computer storage media storing computer-useable instructions that, when used by the one or more processors, cause the one or more processors to:
receive one or more tickets in a queue, each of the one or more tickets being a request to configure or troubleshoot infrastructure or perform services to address an information technology service request made by an originating client of a plurality of clients;
determine an originating client of a ticket of the one or more tickets in the queue;
determine a region corresponding to the originating client;
determine that a particular support team, of a group of support teams, is associated with the region of the originating client;
automatically parse text of the ticket to generate parsed text and identify keywords;
determine that the keywords correspond to the particular support team;
utilizing natural language processing logic, predict a ticket type of the ticket from the parsed text;
determining that the ticket type corresponds to the particular support team;
based on the keywords and the ticket type both corresponding to the particular support team, and on the association of the particular support team with the region of the originating client, selecting the particular support team of the group of support teams; and
route the ticket to an associate of the particular support team.

* * * * *